US006961202B2

United States Patent
Ikedo et al.

(10) Patent No.: US 6,961,202 B2
(45) Date of Patent: Nov. 1, 2005

(54) DATA STORAGE DEVICE HAVING ACCELERATION SENSOR ATTACHED TO CIRCUIT BOARD FOR DETECTING VIBRATIONS IN PLANAR ROTATION DIRECTION ALONG CIRCUIT BOARD

(75) Inventors: Gaku Ikedo, Kanagawa-ken (JP); Mirei Hosono, Kanagawa-ken (JP); Yoshitaka Kakizaki, Kanagawa-ken (JP); Naoyuki Kagami, Kanagawa-ken (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 126 days.

(21) Appl. No.: 10/421,447

(22) Filed: Apr. 23, 2003

(65) Prior Publication Data

US 2004/0001280 A1 Jan. 1, 2004

(30) Foreign Application Priority Data

Apr. 23, 2002 (JP) .......................... 2002-121350

(51) Int. Cl.[7] .......................... G11B 5/596; G11B 5/012
(52) U.S. Cl. .................. 360/77.02; 360/97.01
(58) Field of Search ........................ 360/97.01–97.04

(56) References Cited

U.S. PATENT DOCUMENTS 6,597,532 B1 * 7/2003 Usui et al. ............... 360/97.03
6,721,122 B2 * 4/2004 Aikawa et al. ........... 360/77.02

* cited by examiner

Primary Examiner—A. J. Heinz
(74) Attorney, Agent, or Firm—Bracewell & Giuliani LLP

(57) ABSTRACT

A data storage device includes an enclosure case and a circuit board attached to an outer surface of the enclosure case, the enclosure case containing a spindle motor and a circular movement actuator, the spindle motor being for rotating a storage medium, the circular movement actuator being for controlling a position of a read and write head for reading data from the storage medium and for writing data to the storage medium, the circuit board having an interface cable connector at one end portion thereof for establishing a connection to a host. The circuit board is located between the interface cable connector and the spindle motor, and is attached to the enclosure case by use of a plurality of fastening members. An acceleration sensor is attached to the circuit board next to the fastening members for detecting vibrations applied to the data storage device in a rotation direction in a plane along the circuit board.

10 Claims, 9 Drawing Sheets

(a)

(b)

DATA STORAGE DEVICE HAVING ACCELERATION SENSOR ATTACHED TO CIRCUIT BOARD FOR DETECTING VIBRATIONS IN PLANAR ROTATION DIRECTION ALONG CIRCUIT BOARD

RELATED PATENT APPLICATION

This application claims priority to Japanese Patent Application No. JP2002-121350 (Hitachi Global Storage Technologies Docket No. JP920020056JP1), filed on Apr. 23, 2002, and entitled "Data Storage Device and Circuit Board to be Attached to Data Storage Device".

BACKGROUND OF THE INVENTION

1. Technical Field

The present invention relates to a data storage device typified by a hard disk drive and, more specifically, to an attachment position of an acceleration sensor which detects vibrations applied to a data storage device.

2. Description of the Related Art

A hard disk drive (hereinafter referred to as an HDD), which is a most general data storage for a computer, has a structure in which a single magnetic disk or a plurality of magnetic disks are arranged coaxially and in which the magnetic disk or disks are driven by a spindle motor. Read and write operations of data are carried out by a magnetic head provided so as to face the magnetic disk, and the magnetic head is driven by an actuator, or a voice coil motor (hereinafter referred to as a VCM) in general. The magnetic disk or disks, the magnetic head, and the actuator are contained in a case which is called an enclosure case. The enclosure case is composed of a base made of aluminum alloy having a thin box shape and a top cover for sealing an opening of the base.

The base has a circuit board fastened on a back surface thereof. The circuit board is mounted with elements for controlling the spindle motor, the VCM, and the like. The circuit board is provided with an interface cable connector for establishing a connection with a computer apparatus which serves as a host. At a position on a far side of the interface cable connector, a preamplifier connector is provided. The reason why the preamplifier connector is located on the far side of the interface cable connector as described above is that a wiring distance between the preamplifier connector and the preamplifier can be shortened. On the other hand, the reason why the interface cable connector is located on the same side of the spindle motor is that the above described arrangement is thought to be best based on electrical constraints such as an intensity of a signal, digital or analog, and a noise, along a flow of the signal viewed from the interface cable connector, and based on geometrical constraints such as a position and a size of the VCM included in the enclosure case.

However, in a case of adopting a configuration in which the circuit board and the interface cable connector are arranged as described above, the circuit board and the spindle motor take up a space in a height direction and a horizontal direction. Accordingly, there has been a problem in which the spindle motor is subjected to the geometrical constraints and in which the optimal design point is difficult to be selected.

In Japanese Patent Publication No. 2620526, proposed are an arrangement of a circuit board and an interface cable connector in a magnetic disk device in which a degree of freedom in locating a spindle motor can be increased while satisfying the above described electrical constraints, and a magnetic disk device having such an arrangement. This proposal is an HDD which includes an enclosure case and a circuit board attached to an outer surface of the enclosure case, the enclosure case containing part of a spindle motor for rotating the HDD and a VCM for controlling a position of a carriage which has a magnetic head for reading magnetic information from a magnetic disk and writing magnetic information to a magnetic disk, the circuit board having an interface cable connector for establishing a connection with a host at one end portion thereof. Here, the circuit board is located at a position on the outer surface of the enclosure case, the position being behind the carriage and the voice coil motor, so as not to conflict with the part of the spindle motor protruding from the outer surface of the enclosure case. Meanwhile, the interface cable connector is located on a far side of the spindle motor.

According to the above described HDD, the circuit board does not conflict with the spindle motor, and the interface cable connector is located on the far side of the spindle motor. Therefore, it is possible to increase the degree of freedom in locating the spindle motor without being subjected to a limitation due to the circuit board. In addition, it is possible to optimize a size of the circuit board.

Incidentally, in a magnetic disk device used in a server system or the like, a plurality of HDDs are generally contained in one frame, and a plurality of HDDs can be simultaneously accessed. In such a state, there are many cases in which the HDDs receive vibrations (disturbances) in a rotation direction. Here, the rotation direction denotes a rotation direction in a plane along the circuit board. For an HDD having a rotary type access mechanism such as a VCM, these vibrations in the rotation direction become disturbances in an off track direction, thus causing deterioration in performance of a read operation and a write operation.

Heretofore, a designing of an HDD has been made such that a feedback control gain has a sufficient restraint power with respect to such disturbances. However, in response to decrease in a track pitch, it is becoming difficult to have a sufficient restraint power due to constraints of mechanical resonance in an access mechanism and the like.

In order to solve the problem, as disclosed in Japanese Unexamined Patent Publication No. 2001-344881 and U.S. Patent Publication No. 5426545, proposed is a method of correcting disturbances by detecting vibrations by use of two acceleration sensors and carrying out feedforward control of a VCM

SUMMARY OF THE INVENTION

It is an object of the present invention that, in a case where an arrangement on a circuit board which is disclosed in Japanese Patent Publication No. 2620526 described above is adopted when two acceleration sensors required in a case of using acceleration for feedback control are mounted on the circuit board as proposed heretofore, the acceleration sensors are located at optimal positions based on positions of screws which attach the circuit board to a base. In addition, it is another object of the present invention to minimize disturbance vibration noises in directions other than a desired direction by adopting the above described positions at which the acceleration sensors are located, thus improving accuracy of vibration detection in a rotation direction.

In a hard disk drive in which an arrangement of a spindle and a circuit board is adopted as described in Japanese Patent Publication No. 2620526, in a case where a designing has been made such that a height of a disk stack of the hard disk drive can be maximized and such that a height of a VCM can be maximized, the circuit board 12 basically has about a half area (half size) of a base 2 as shown in FIG. 2.

Moreover, in a case where a plurality of HDDs 1 are attached to a system as shown in FIG. 8A, as basic disturbances in a rotation direction, there mainly exist so-called handshake-like vibrations about an interface cable connector 12a as shown in FIG. 9 and rotational vibrations about a center of gravity of the HDD 1 as shown in FIG. 10. In this case, in order to improve detection sensitivity, it is important to keep two acceleration sensors apart from rotation centers of the above described vibrations as far as possible and to set central angles between the acceleration sensors with respect to the rotation centers wide. Therefore, in a card of a so-called half size with respect to the base 2, it is desired to locate the acceleration sensors 20a and 20b at positions shown in FIG. 2. Furthermore, when the circuit board 12 is attached to the base 2, in order to reduce unnecessary vibrations from the connector 12a for an interface cable, the circuit board 12 should be fastened to the circuit board 12 in the vicinities of both end portions of the interface cable connector 12a in a width direction thereof (positions of the screws 22a and 22b in FIG. 2) by use of screws. Moreover, in order to restrain vibrations in a direction along a plane of the circuit board 12, the circuit board 12 should be fastened at two positions on a closer side to the spindle motor 21 by use of screws. Here, in order to increase the height and size of the VCM (not shown in FIG. 2), one of the two screws should be located on a side portion of the HDD 1 as close as possible to the VCM between the spindle motor 21 and the VCM (position of the screw 22c in FIG. 2) so as to avoid a portion corresponding to the VCM. Another one of the two screws should be located on a side portion on the opposite side (position of the screw 22d in FIG. 2). Note that, as shown in FIG. 8A, the present invention has a large effect in a case of where the present invention is applied to a system in which the HDDs 1 are placed horizontally. However, it is also possible to apply to a system in which the HDD 1 are placed vertically as shown in FIG. 8B.

Based on the above described positions of the screws 22a to 22d, vibrations in the Z direction (direction of a thickness of the HDD 1) of the circuit board 12 were analyzed. As a result, it is confirmed that the vibrations were minimum in regions closer to the center of the circuit board 12 than the screws 22c and 22d, the regions being also in the vicinities of the screws 22c and 22d. Moreover, in the regions closer to the center of the circuit board 12 than the screws 22c and 22d, the detection sensitivity can be sufficiently obtained in the two types of rotation directions described above. Furthermore, referring to an S/N ratio of various elements, wires, and the acceleration sensors 20a and 20b mounted on the circuit board 12, an optimal positional relationship can be obtained.

The present invention is based on the above described knowledge and is applied to a data storage device which includes an enclosure case and a circuit board to be attached to an outer surface of the enclosure case, the enclosure case containing a spindle motor and a circular movement actuator, the spindle motor being for rotating a disk shaped storage medium, the circular movement actuator being for controlling a position of a read and write head for reading data from the disk shaped storage medium and for writing data to the disk shaped storage medium, the circuit board having an interface cable connector at one end portion thereof for establishing a connection to a host. In the data storage device, the circuit board is located between the interface cable connector and the spindle motor, and is attached to the enclosure case by use of a plurality of fastening members. In addition, an acceleration sensor is attached to the circuit board in the vicinity of one of the fastening members such as screws, the acceleration sensor being for detecting vibrations applied to the data storage device in a rotation direction in a plane along the circuit board.

In the data storage device of the present invention, it is preferred that the acceleration sensor is located closer to a center of the circuit board than the fastening members. Moreover, it is preferred that the acceleration sensor is located between a rotation axis of the spindle motor and a circular movement axis of the circular movement actuator. In addition, in the data storage device of the present invention, it is preferred to adopt a form in which a pair of the acceleration sensors are located to be spaced a predetermined distance away from each other in a state where the circular movement axis of the circular movement actuator is positioned between the acceleration sensors and in which the vibrations in the rotation direction are detected by the pair of acceleration sensors.

In the data storage device of the present invention, it is preferred that a pair of the fastening members are respectively located in the vicinities of both end portions of the interface cable connector in a width direction thereof and that another pair of the fastening members are located to be spaced a predetermined distance away from each other between the circular movement axis of the circular movement actuator and the rotation axis of the spindle motor. In this case, it is preferred that the pair of acceleration sensors are respectively located in the vicinities of the pair of the fastening members which are located to be spaced the predetermined distance away from each other between the circular movement axis of the circular movement actuator and the rotation axis of the spindle motor.

Alternatively, in the present invention, acceleration sensors are attached to a data storage device which includes a disk shaped medium for storing data, the disk shaped medium being driven to rotate about a rotation axis; an actuator attached with a head for reading data from the disk shaped medium and for writing data to the disk shaped medium, the actuator moving circularly about a circular movement axis; an enclosure case including a box shaped base with a predetermined width and a cover, the box shaped base having an opening for containing the disk shaped medium and the actuator, the cover closing the opening; a circuit board attached to a bottom surface of the box shaped base, the circuit board being mounted with at least an element for controlling rotation drive of the disk shaped medium and for controlling circular movement of the actuator; and a plurality of fastening members for fastening the circuit board to the box shaped base. Two of the acceleration sensors are respectively located in the vicinities of two of the fastening members in a region formed by connecting the plurality of fastening members, and thereby the above described vibrations in the rotation direction are detected.

In the data storage device described above, at positions at which the two acceleration sensors are located, vibrations on the circuit board in a thickness direction of the enclosure case are reduced in comparison to other regions due to the presence of the fastening members. Accordingly, it is possible to detect the vibrations in the rotation direction with high accuracy.

The present invention is also provided as a single circuit board. The circuit board is attached to a data storage device including an enclosure case for containing part of a spindle motor and a circular movement actuator, the spindle motor being for rotating a disk shaped storage medium, the circular movement actuator being for controlling a position of a read and write head which reads data from the disk shaped storage medium and writes data to the disk shaped storage medium. The circuit board has a feature in that the circuit board is attached to the enclosure case by use of a plurality of fastening members and in that an acceleration sensor is located at a position closer to a center of the circuit board than the fastening members, the position being also in the vicinity of a position at which one of the fastening members is located, the acceleration sensor detecting vibrations applied to the data storage device in a rotation direction.

The circuit board described above has an interface cable connector at one end portion, the connector being for establishing a connection with a host, and is located at a position on an outer surface of the enclosure case such that the circuit board does not conflict with part of the spindle motor exposed on the outer surface.

Moreover, the acceleration sensor is located between a rotation axis of the spindle motor and a circular movement axis of the circular movement actuator in a case where the circuit board is attached to the enclosure case

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF A PREFERRED EMBODIMENT

Figure 1:
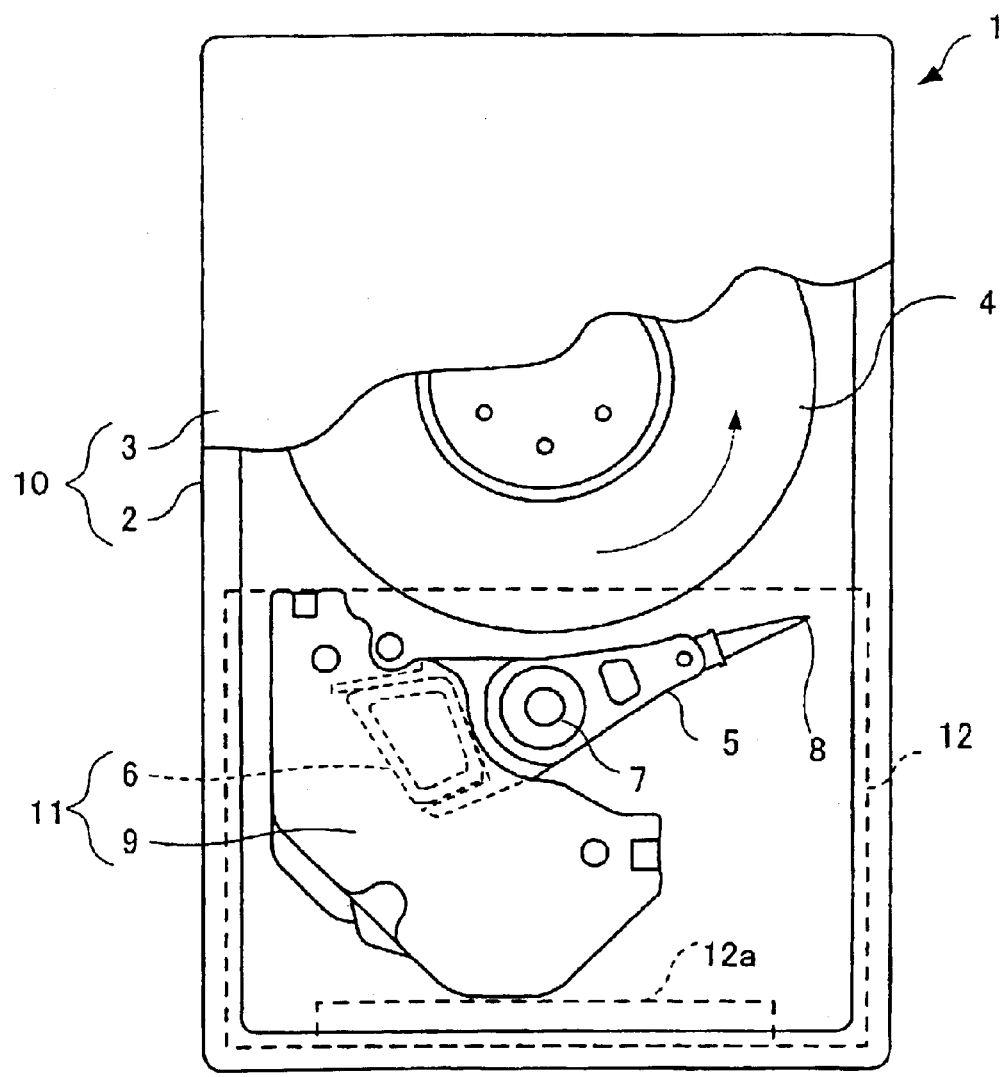
FIG. 1 is a schematic plan view in which an HDD according to an embodiment of the present invention is viewed from a front surface thereof.
Figure 2:
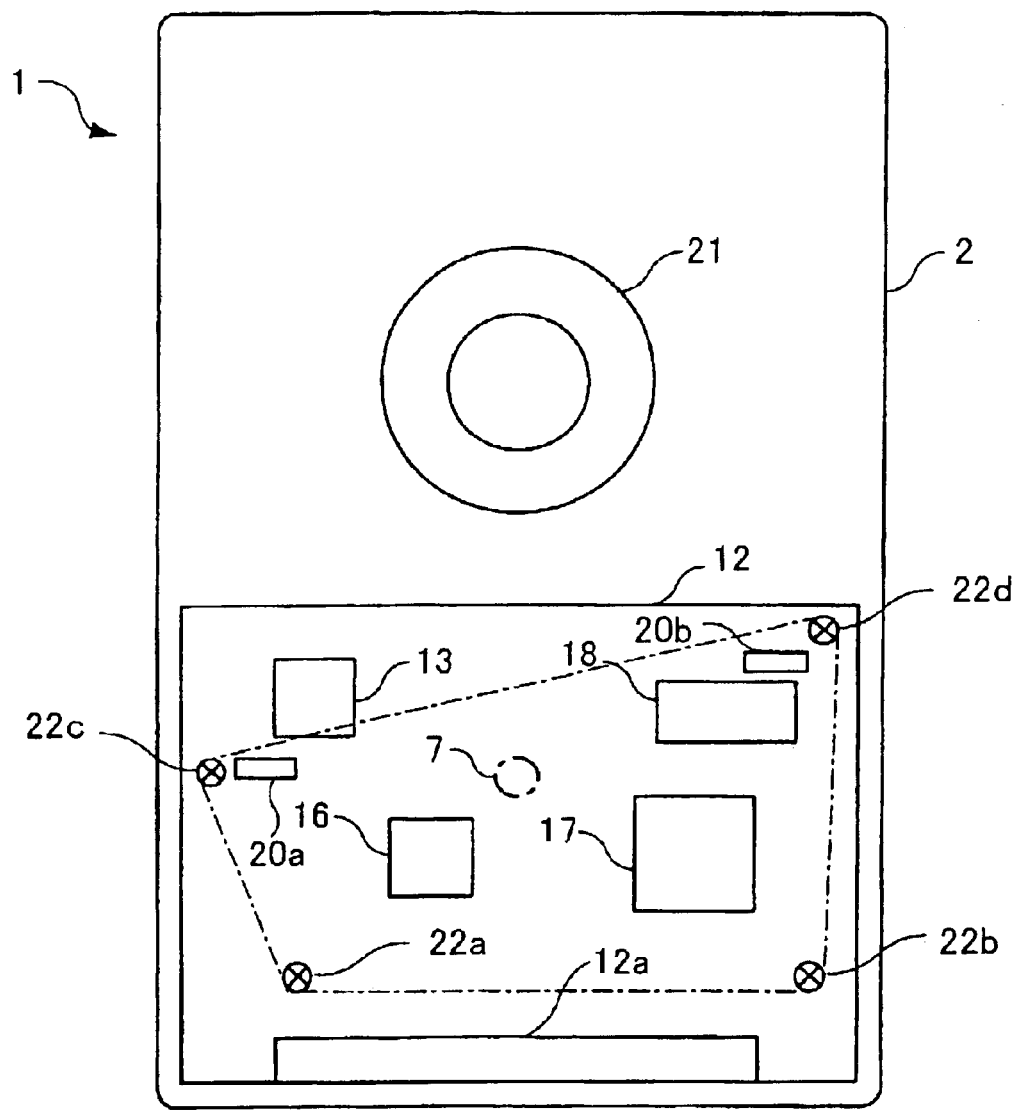
FIG. 2 is a schematic plan view in which the HDD according to the embodiment is viewed from a back surface thereof.
Figure 3:
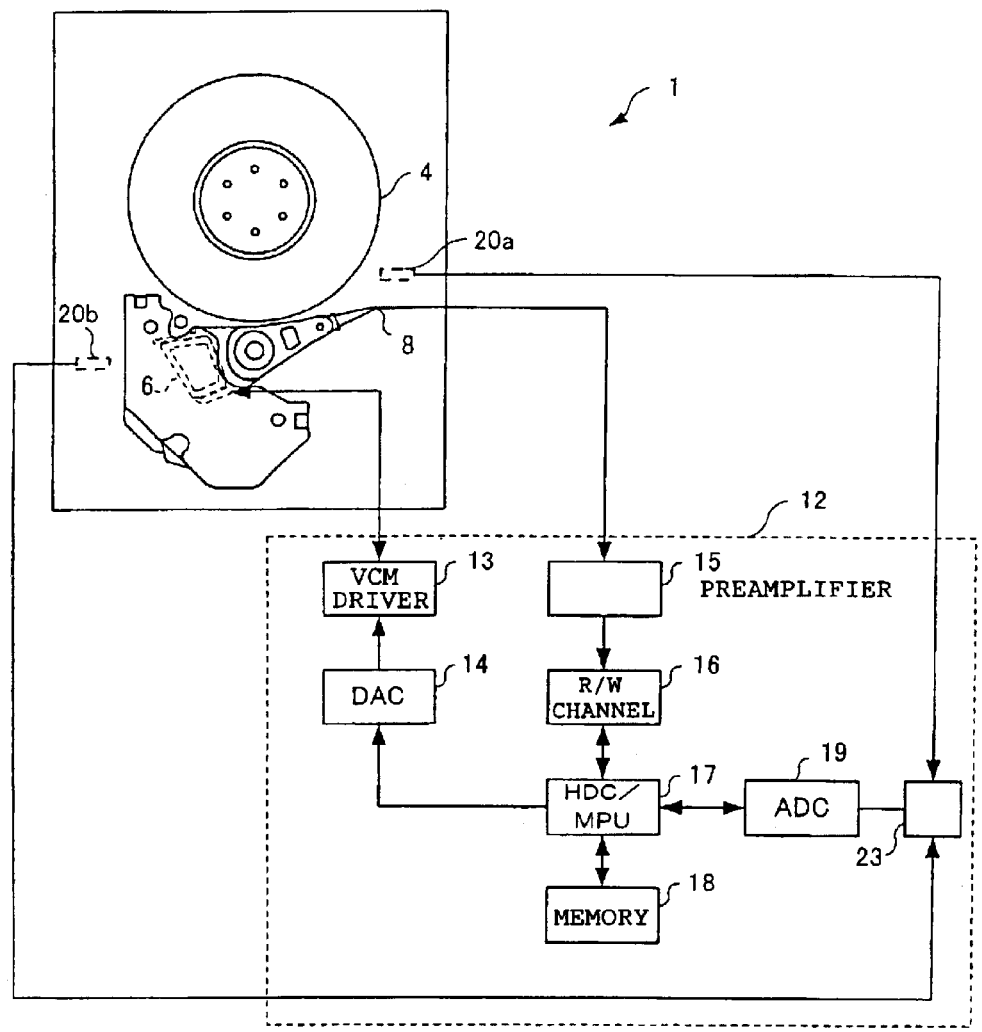
FIG. 3 is a function block diagram of the HDD according to the embodiment.

An embodiment of the present invention will now be described based on an example in which the present invention is applied to a hard disk drive (HDD) 1. FIG. 1 is a schematic plan view of the HDD 1 viewed from a front surface. FIG. 2 is a schematic plan view of the HDD 1 viewed from a back surface. FIG. 3 is a function block diagram of the HDD 1.

As shown in FIG. 1, in the HDD 1 as a data storage device, a top cover 3 seals an opening of an upper portion of a box shaped base 2 made of, for example, aluminum alloy, thus forming an enclosure case 10. The top cover 3 made of, for example, brass is fastened to the base 2 by use of screws, interposing a sealing member (not shown) of a rectangular frame shape therebetween. Note that, in FIG. 1, part of the top cover 3 is cut off.

In the enclosure case 10, provided is a spindle motor (not shown in FIG. 1) of, for example, a three-phase direct current in-hub servo motor. The spindle motor carries out rotation drive of a magnetic disk 4 as a storage medium. Depending on a storage capacity required for the HDD 1, a single magnetic disk 4 or a plurality of magnetic disks 4 are installed.

In addition, in the enclosure case 10, an actuator arm 5 is provided. A center portion of the actuator arm 5 is supported on the base 2 through a pivot shaft 7 in a state where the actuator arm 5 can move circularly. The actuator arm 5 is provided with a magnetic head 8 at one end portion thereof and is provided with a voice coil motor (VCM) coil 6 at the other end portion thereof. The VCM coil 6, and a VCM stator 9 which has a permanent magnet as an element, constitute a VCM 11. By supplying a VCM current to the VCM coil 6, the actuator arm 5 is moved circularly toward a predetermined position on the magnetic disk 4. This circular movement effectuates a seek operation of the magnetic head 8. When the HDD 1 is operating, the rotation of the magnetic disk or disks 4 is driven about the spindle shaft of the spindle motor. On the other hand, when the HDD 1 is not operating, the rotation of the magnetic disk or disks 4 is stopped (stationary).

The magnetic head 8 is composed of a slider (not shown), a read head of a giant magnetoresistive sensor, and a write head of an induction transducer. Here, the read and write heads are attached to the slider. When data is read or written or when a seek operation is performed, the read head reads servo information. In addition, when a read operation is performed, the read head reads data. When data is written or read, the actuator arm 5 moves circularly on a surface of the rotating magnetic disk 4, and the magnetic head 8 performs the seek operation for scanning an arbitrary position of a track on the magnetic disk 4. In this case, the slider is given a buoyant force by an air current generated between the magnetic disk 4 and the slider itself. Thus, the magnetic head 8 floats at a certain distance above the surface of the magnetic disk 4, and the distance is maintained.

The base 2 is provided with a circuit board 12 on a back surface (a surface reverse to a surface on which the top cover 3 is provided) thereof. As shown in FIG. 1, the circuit board 12 has a surface area equal to or less than half of a surface area of the base 2. The circuit board 12 is provided with an interface cable connector 12a at a peripheral portion thereof. Consequently, the circuit board 12 is located between the interface cable connector 12a and the spindle motor. The circuit board 12 receives a command and power supply from a computer apparatus (not shown) which serves as a host through the connector 12a for an interface cable.

FIG. 2 is a plan view showing the back surface of the base 2 of the HDD 1. As shown in FIG. 2, the base 2 is provided with the circuit board 12 on the back surface thereof. The circuit board 12 is fastened to the base 2 by use of the screws 22a to 22d. On the circuit board 12, mounted are a HDC (hard disk controller)/MPU 17, a VCM driver 13, a read/write (R/W) channel 16, and a memory 18. In the vicinity of the screw 22c, an acceleration sensor 20a is provided; in the vicinity of the screw 22d, an acceleration sensor 20b is provided. The acceleration sensor 20a is located closer to a center of the circuit board 12 than the screw 22c; the acceleration sensor 20b is located closer to the center of the circuit board 12 than the screw 22d. In addition, the acceleration sensors 20a and 20b are located inside a region (shown by a dashed dotted line) formed by connecting the screws 22a to 22d. Note that, although other elements are mounted on the circuit board 12, a description thereof is omitted.

On the back surface of the base 2, part of the spindle motor 21 is exposed. However, as shown in FIG. 2, the HDD 1 is structured such that the spindle motor 21 exposed on the back surface of the base 2 does not conflict with the circuit board 12. In other words, the spindle motor 21 is not subjected to constraints due to the presence of the circuit board 12, and therefore there is a degree of freedom in locating the spindle motor 21.

It should be understood that the acceleration sensors 20a and 20b are arranged between the pivot shaft 7 and the spindle motor 21. As described above, the acceleration sensors 20a and 20b are respectively located closer to the center of the circuit board 12 than the screws 22c and 22d which fasten the circuit board 12 to the base 2, in the vicinities of the screws 22c and 22d, between the pivot shaft 7 and the spindle motor 21. Furthermore, the acceleration sensors 20a and 20b are arranged so as to be spaced a predetermined distance away from each other in a state where the pivot shaft 7 is positioned between the acceleration sensors 20a and 20b. Sensitivity in detecting vibrations in a rotation direction is improved with increasing distance between the acceleration sensors 20a and 20b. As described later, the HDD 1 according to the present invention is characterized by positions at which the acceleration sensors 20a and 20b are located.

Next, operations of the HDD 1 will be described with reference to FIG. 3.

As shown in FIG. 3, servo information stored in the magnetic disk 4 is read by use of the magnetic head 8. A servo signal from the magnetic head 8 is amplified with a preamplifier 15, and is then read as position information into the HDC/MPU 17 through the R/W channel 16. On the other hand, pieces of vibration (disturbance) information detected with the acceleration sensors 20a and 20b are read into the HDC/MPU 17 through an analog to digital converter (ADC) 19. The position information and the disturbance information read into the HDC/MPU 17 are processed in accordance with a program recorded on the memory 18, and thus are converted into a control signal. The control signal is transferred to the VCM driver 13 through a digital to analog converter (DAC) 14, thus controlling an operation of the VCM 11. Accordingly, the magnetic head 8 is subjected to positioning control with consideration of disturbances.

Figure 4:
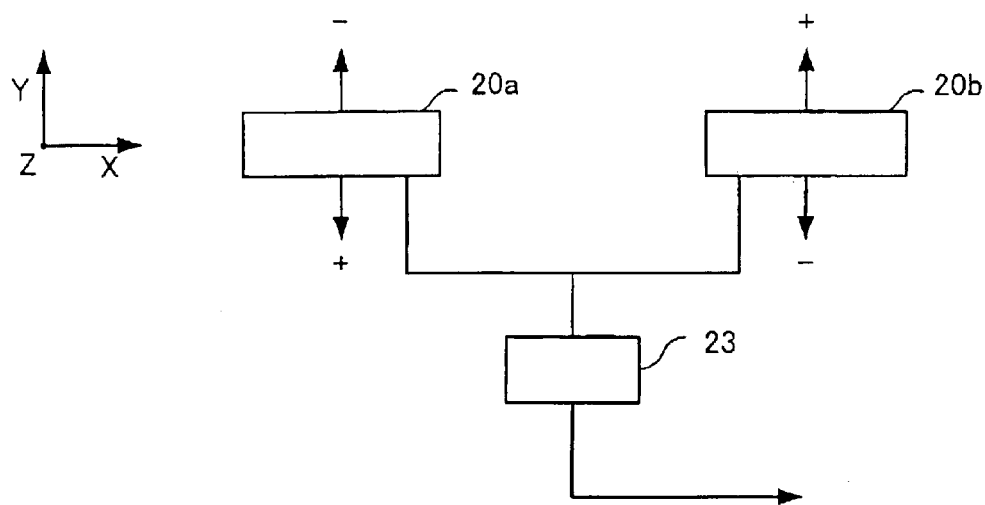
FIG. 4 is a view for explaining a method of detecting vibrations with acceleration sensors.
Figure 5:
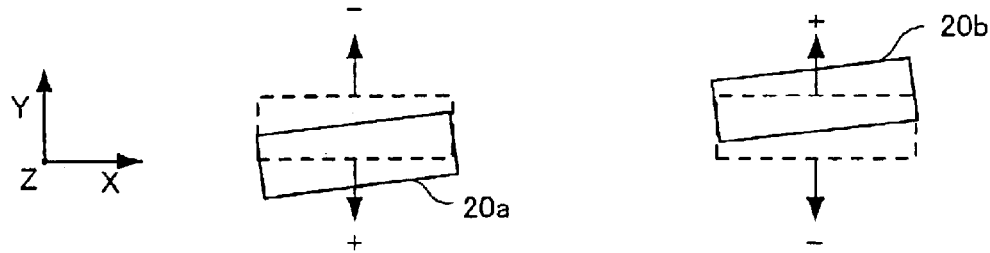
FIG. 5 is a view for explaining the method of detecting vibrations with the acceleration sensors.

FIG. 4 is a view for explaining a mechanism to detect a vibration direction by use of the two acceleration sensors 20a and 20b. As shown in FIG. 4, the acceleration sensors 20a and 20b are arranged so as to detect displacement in respective directions, that is, plus and minus directions opposite to each other. The two acceleration sensors 20a and 20b are designed to be able to detect vibrations in a direction of a line and vibrations in the rotation direction by adding outputs of the acceleration sensors 20a and 20b together with an adder 23. For example, referring to vibrations in a direction of the X axis (longitudinal direction of the acceleration sensors 20a and 20b), there are no output due to characteristics of the acceleration sensors 20a and 20b. Similarly, there are no output in a case of vibrations in a direction of the Z axis (vertical direction of the circuit board 12). However, referring to vibrations in a direction of the Y axis (short edge direction of the acceleration sensors 20a and 20b), outputs can be obtained. When vibrations in the rotation direction are applied, the acceleration sensors 20a and 20b generate plus signals, as shown in FIG. 5, for example. The plus signals are added together, thus making it possible to detect the vibrations in the rotation direction.

The pieces of vibration information detected with the acceleration sensors 20a and 20b are added together by use of the adder 23, and are transferred to the ADC 19 as a compensation signal in which a gain is adjusted. The compensation signal is converted into a digital signal with the ADC 19, and then is transferred to the HDC/MPU 17. The HDC/MPU 17 subtracts the compensation signal from the position information transferred from the R/W channel 16, and thus outputs a command value to provide compensation for disturbances with respect to the VCM driver 13. The VCM driver 13 drives the VCM 11 based on the command value thus transferred.

Figure 6:
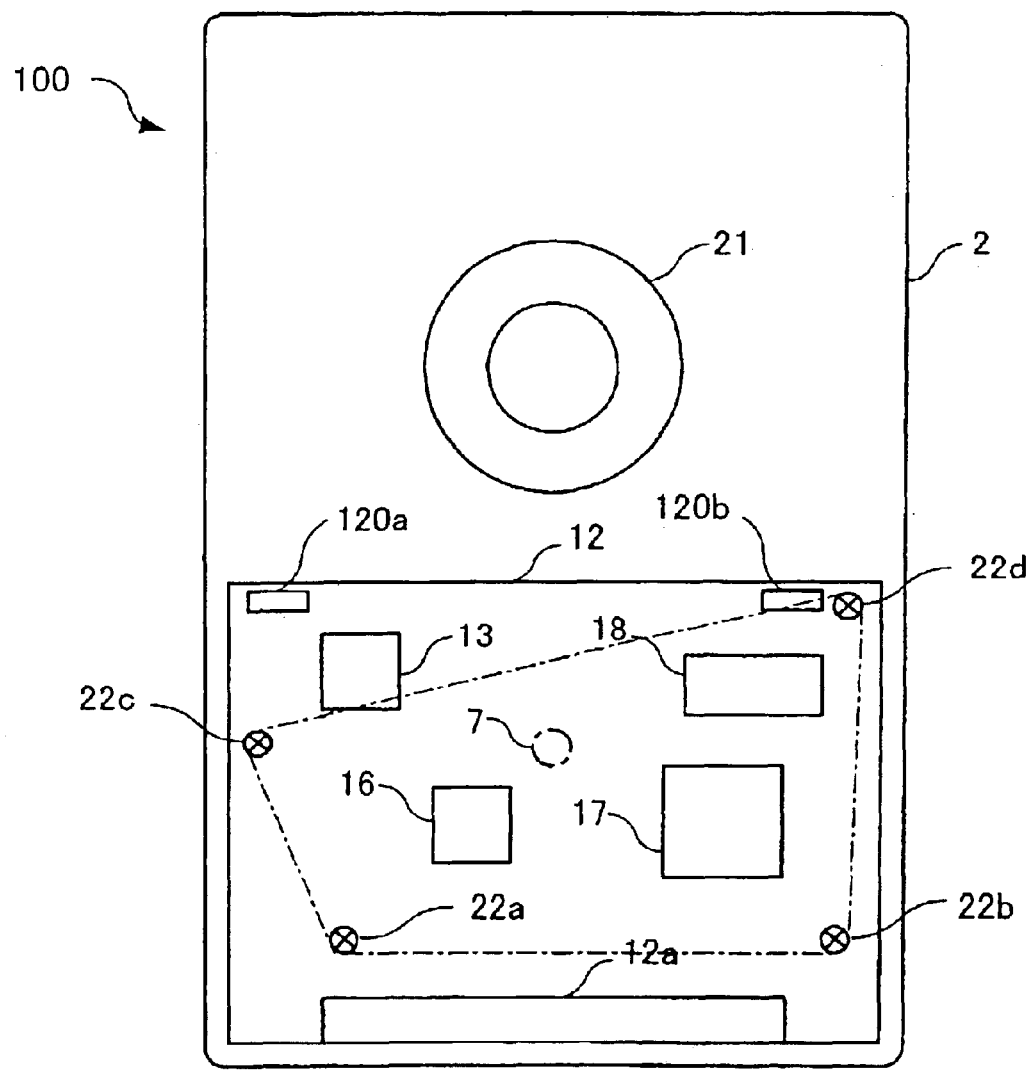
FIG. 6 is a schematic plan view in which an HDD according to a comparative example is viewed from a back surface thereof.

An experiment was conducted in order to confirm effects due to positions at which the acceleration sensors 20a and 20b were located in the embodiment. The experiment is conducted so as to measure frequency characteristics detected by the acceleration sensors 20a and 20b upon applying vibrations in the direction of the Z axis with respect to the HDD 1 according to the embodiment. Note that, as a comparative example, a similar experiment was conducted for an HDD 100 in which two acceleration sensors 120a and 120b were located along an upper edge of the circuit board 12 as shown in FIG. 6. Note that the HDD 100 shown in FIG. 6 is similar in composition to the HDD 1 according to the embodiment except for positions of the acceleration sensors 120a and 120b. The result is shown in FIG. 7.

Figure 7:
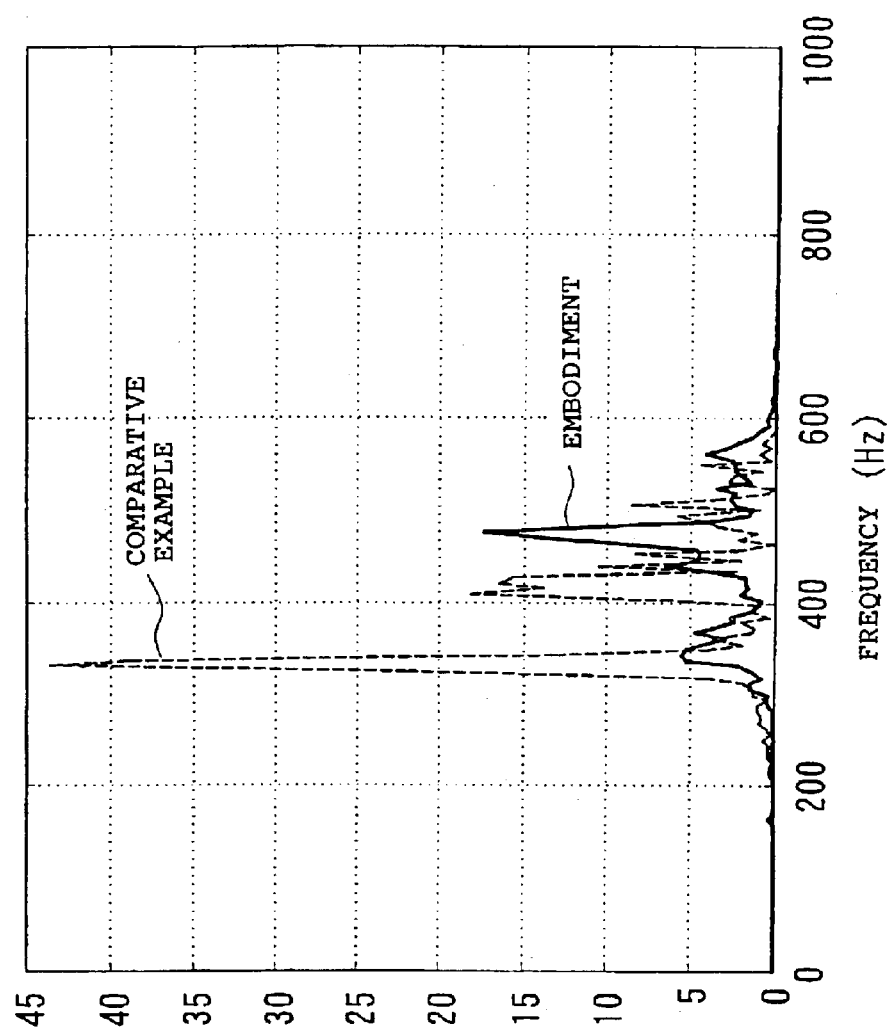
FIG. 7 is a graph showing a result of an experiment in which vibrations in a direction of the Z axis are applied to the HDD according to the embodiment and the HDD according to the comparative example.
Figure 8:
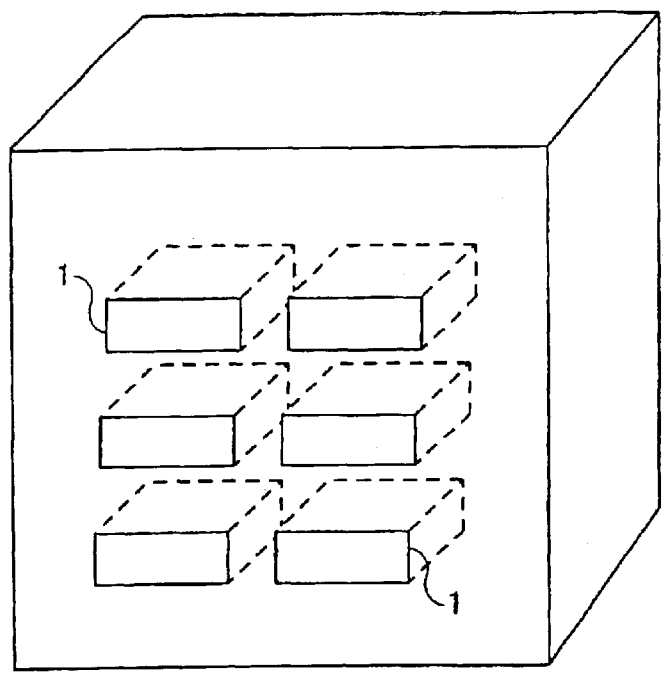
FIGS. 8A and 8B are views showing systems, each of which is installed with a plurality of HDD.
Figure 8:
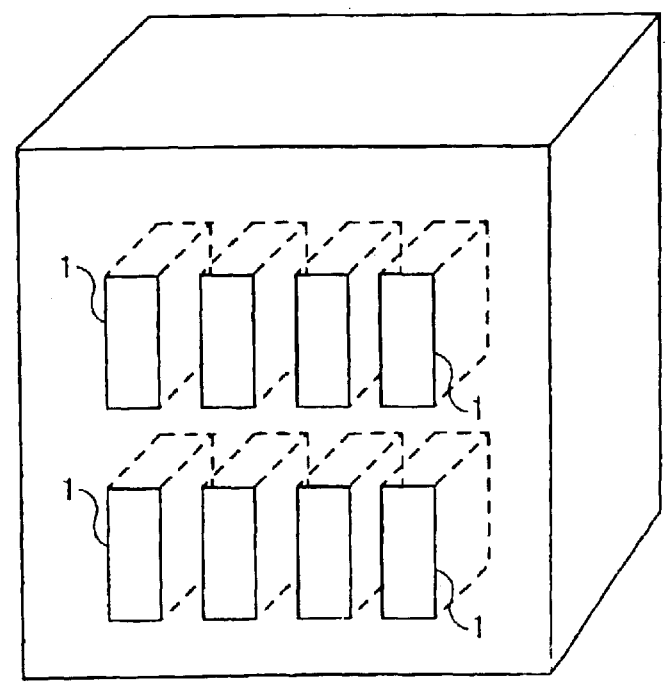
Figure 9:
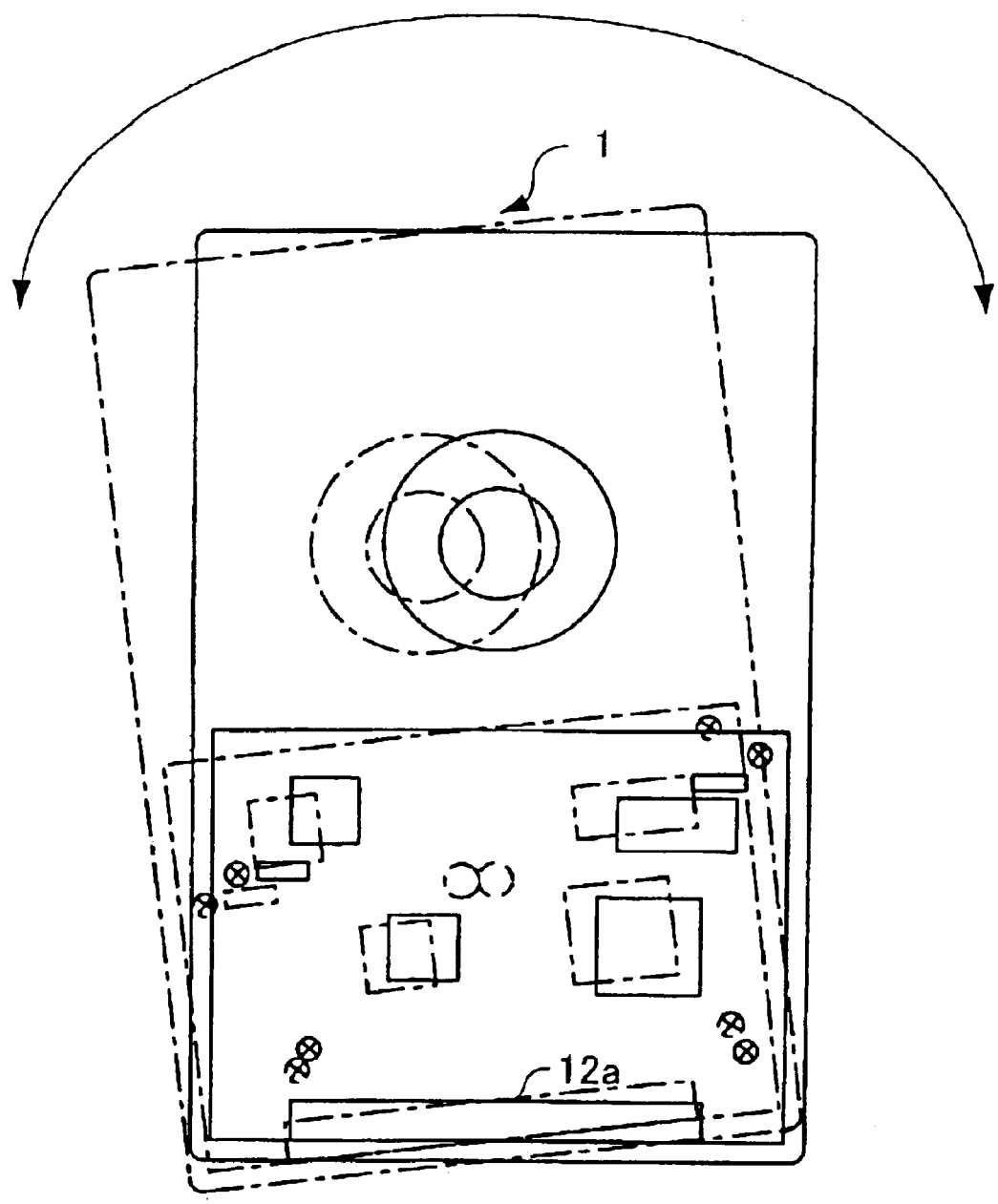
FIG. 9 is a view showing handshake-like vibrations applied to an HDD.
Figure 10:
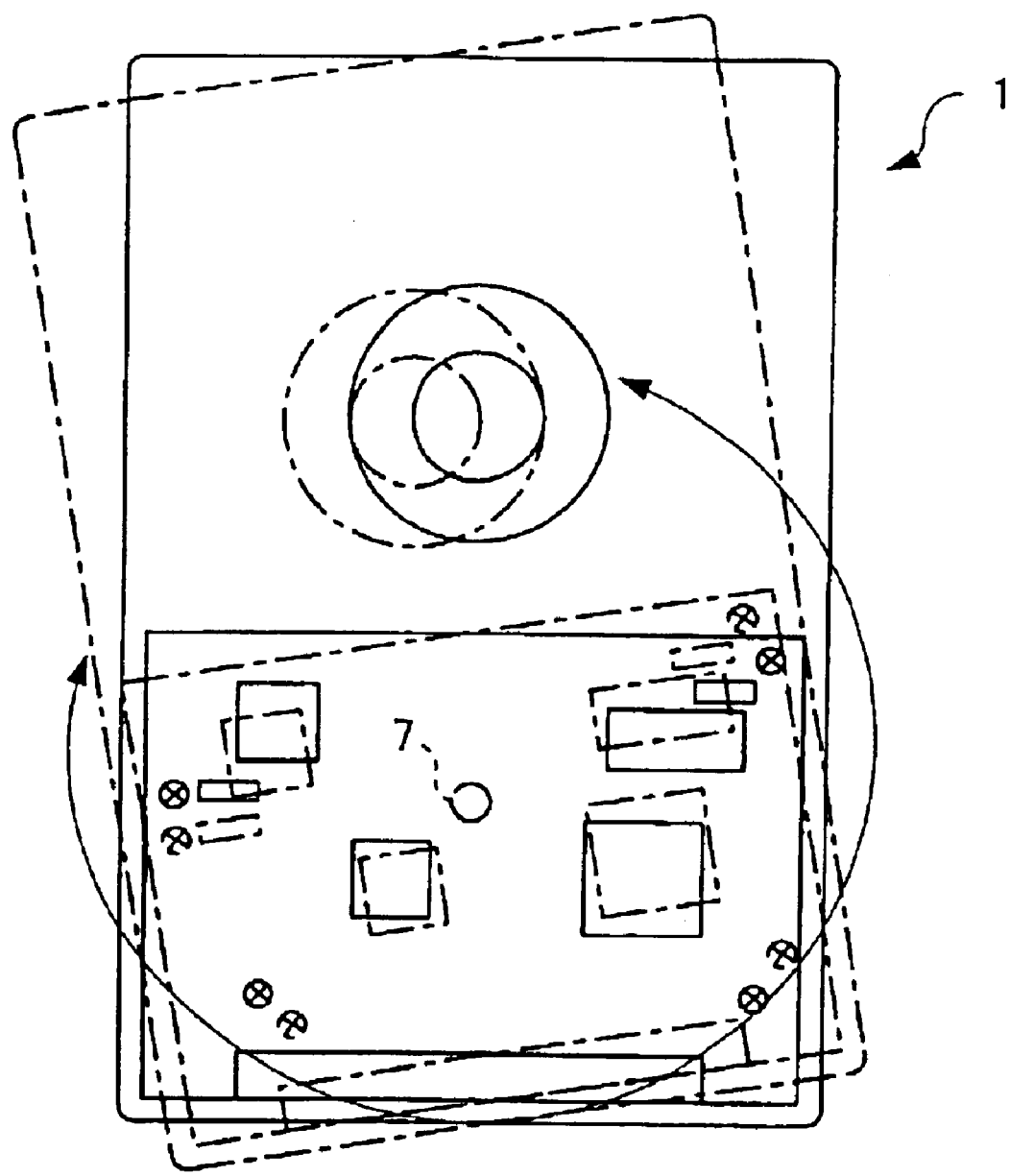
FIG. 10 is a view showing rotational vibrations applied to an HDD.

As shown in FIG. 7, in a case of the HDD 100 (comparative example), significant vibrations are observed in the vicinities of 300 Hz and 420 Hz. On the other hand, in a case of the HDD 1 according to the embodiment, these vibrations are not observed. Accordingly, by adopting the positions of the acceleration sensors 20a and 20b according to the embodiment, it is possible to reduce detection of vibrations in the direction of the Z axis. Moreover, it is possible to detect disturbances in the rotation direction with high accuracy.

Here, in the HDD 100 according to the comparative example, a position at which the acceleration sensor 120a is located is positioned further away from the center of the circuit board 12 than the screw 22c. This is obvious from the fact that the acceleration sensor 120a is located outside the region formed by connecting the screws 22a to 22d. In addition, it cannot be said that the acceleration sensor 120a is located in the vicinity of the screw 22c, unlike the acceleration sensor 20a according to the embodiment.

At the position at which the acceleration sensor 120a is located, vibrations are larger than vibrations at the position at which the acceleration sensor 20a is located when vibrations are applied in the direction of the Z axis. This is because a portion of the circuit board 12 which extends outwardly from the screw 22c is relevant to a so-called free end. When vibrations in the direction of the Z axis occur, displacement in a horizontal direction occurs at the free end as well as displacement in the direction of the Z axis. This is obvious from an example in which a predetermined point of a beam is displaced in a horizontal direction when a free end of the beam supported in the horizontal direction is flexed. Thus, in the HDD 1 according to the present invention, the acceleration sensors 20a and 20b are located at the positions described above, thereby reducing detection of vibrations in the direction of the Z axis.

As described above, according to the present invention, since positions at which acceleration sensors are located are optimized, it is possible to reduce detection of vibrations in a direction of the Z axis. As a result, it is possible to improve accuracy of detection of vibrations in a rotation direction.

Although the preferred embodiments of the present invention have been described in detail, it should be understood that various changes, substitutions and alternations can be made therein without departing from spirit and scope of the inventions as defined by the appended claims.

What is claimed is:

1. A data storage device, comprising:
   an enclosure case including a base and a circuit board attached to an outer surface of the enclosure case, the enclosure case containing a spindle motor for rotating a storage medium, and a circular movement actuator for controlling a position of a read and write head for reading data from the storage medium and for writing data to the storage medium, the circuit board having an interface cable connector for establishing a connection to a host;
   the circuit board being located between the interface cable connector and the spindle motor and attached to the enclosure case by use of a plurality of fastening members, and the circuit board having an acceleration sensor attached thereto in a vicinity of one of the fastening members, the acceleration sensor being for detecting vibrations in a rotation direction in a plane along the circuit board; and
   the circuit board having a surface area that is equal to or less than half of a surface area of the base.

2. The data storage device of claim 1, wherein the acceleration sensor is located closer to a center of the circuit board than the fastening members.

3. The data storage device of claim 1, wherein the acceleration sensor is located between a rotation axis of the spindle motor and a circular movement axis of the circular movement actuator, a longitudinal direction extends between the rotation axis and the circular movement actuator, a lateral direction is transverse to the longitudinal direction, the plurality of fastening members define a fastening member perimeter that connects adjacent ones of the plurality of fastening members, the acceleration sensor is located inside the fastening member perimeter, and the rotation axis is longitudinally spaced apart from and located outside of the fastening member perimeter.

4. The data storage device of claim 3, wherein vibrations in a rotation direction are detected by a pair of the acceleration sensors which are spaced a predetermined distance away from each other in a state where the circular movement axis of the circular movement actuator is positioned between the acceleration sensors.

5. The data storage device of claim 4, wherein a pair of the fastening members are respectively located adjacent to the interface cable connector in a width direction thereof and a pair of the fastening members are located at a predetermined distance away from each other between the circular movement axis of the circular movement actuator and the rotation axis of the spindle motor; and
   the pair of acceleration sensors are respectively located adjacent to the pair of the fastening members which are located at the predetermined distance away from each other between the circular movement axis of the circular movement actuator and the rotation axis of the spindle motor.

6. A data storage device, comprising:
   a disk medium for storing data, the disk medium being driven to rotate about a rotation axis;
   an actuator attached with a head for reading data from the disk medium and for writing data to the disk medium, the actuator moving circularly about a circular movement axis;
   an enclosure case including a base and a cover, the base having an opening for containing the disk medium and the actuator, the cover for closing the opening, a longitudinal direction extending betwwen the rotation axis and the circular movement axis, and a lateral direction that is transverse to the longitudinal direction;
   a circuit board attached to a bottom surface of the base, the circuit board being mounted with at least an element for controlling rotational drive of the disk medium and for controlling circular movement of the actuator;
   a plurality of fastening members for fastening the circuit board to the base, the plurality of fastening members defining a fastening member perimeter that connects adjacent ones of the plurality of fastening members;
   two acceleration sensors which are respectively located adjacent to two of the fastening members in inside the fastening member perimeter; and
   the rotation axis is longitudinally spaced apart from and located outside of the fastening member perimeter.

7. The data storage device of claim 6, wherein vibrations on the circuit board in a thickness direction of the enclosure case are reduced at positions at which the acceleration sensors are located in comparison to other regions formed by the fastening members, and the circuit board has a surface area that is equal to or less than half of a surface area of the base.

8. An apparatus, comprising:
   a data storage device including an enclosure case having a base for containing part of a spindle motor having a rotation axis and a circular movement actuator having a circular movement axis, the spindle motor being for rotating a disk storage medium, the circular movement actuator being for controlling a position of a read and write head which reads data from the disk storage medium and writes data to the disk storage medium;
   a circuit board attached to the data storage device, the circuit board having a surface area that is equal to or less than half of a surface area of the base;
   an acceleration sensor attached to the enclosure case by a plurality of fastening members and located at a position closer to a center of the circuit board than the fastening members, the position also being in a vicinity of a position at which one of the fastening members is located, the acceleration sensor detecting vibrations applied to the data storage device in a rotation direction; and
   a longitudinal direction extending between the ratation and axis and the circular movement axis, a lateral direction transverse to the longitudinal direction, the plurality of fastening members defining a fastening member perimeter that connects adjacent ones of the plurality of fastening members, the acceleration sensor is located inside the fastening member perimeter, and the rotation axis is longitudinal spaced apart from and located outside of the fastening member perimeter.

9. The circuit board of claim 8, wherein the circuit board has an interface cable connector at one end portion, the connector being for establishing a connection with a host, and the circuit board is located at a position on an outer surface of the enclosure case such that the circuit board is spaced apart from part of the spindle motor exposed on the outer surface.

10. The circuit board of claim 8, wherein the acceleration sensor is located between the rotation axis of the spindle motor and the circular movement axis of the circular movement actuator in a case where the circuit board is attached to the enclosure case.

* * * * *

UNITED STATES PATENT AND TRADEMARK OFFICE
CERTIFICATE OF CORRECTION

PATENT NO. : 6,961,202 B2
DATED : November 1, 2005
INVENTOR(S) : Gaku Ikedo et al.

It is certified that error appears in the above-identified patent and that said Letters Patent is hereby corrected as shown below:

Column 10,
Line 14, replace "betwwen" with -- between --.

Signed and Sealed this

Third Day of January, 2006

JON W. DUDAS
*Director of the United States Patent and Trademark Office*